US006972046B2

(12) United States Patent
Sun et al.

(10) Patent No.: US 6,972,046 B2
(45) Date of Patent: Dec. 6, 2005

(54) PROCESS OF FORMING MAGNETIC NANOCOMPOSITES VIA NANOPARTICLE SELF-ASSEMBLY

(75) Inventors: Shouheng Sun, Millwood, NY (US); Hao Zeng, Buchanan, NY (US)

(73) Assignees: International Business Machines Corporation, Armonk, NY (US); Louisiana Tech University, Ruston, IA (US)

( * ) Notice: Subject to any disclaimer, the term of this patent is extended or adjusted under 35 U.S.C. 154(b) by 177 days.

(21) Appl. No.: 10/340,761

(22) Filed: Jan. 13, 2003

(65) Prior Publication Data

US 2004/0134565 A1 Jul. 15, 2004

(51) Int. Cl.⁷ ............................................. B22F 9/24
(52) U.S. Cl. .......................... 75/348; 75/351; 75/370
(58) Field of Search ........................ 75/348, 351, 370

(56) References Cited

U.S. PATENT DOCUMENTS

| | | | | |
|---|---|---|---|---|
| 6,045,925 A | * | 4/2000 | Klabunde et al. | 428/548 |
| 6,054,495 A | * | 4/2000 | Markowitz et al. | 516/97 |
| 6,254,662 B1 | * | 7/2001 | Murray et al. | 75/348 |
| 6,294,401 B1 | * | 9/2001 | Jacobson et al. | 438/99 |
| 6,676,729 B2 | * | 1/2004 | Sun | 75/348 |
| 6,706,795 B1 | * | 3/2004 | Garti et al. | 524/431 |
| 6,773,823 B2 | * | 8/2004 | O'Connor et al. | 428/548 |
| 6,783,569 B2 | * | 8/2004 | Cheon et al. | 75/348 |
| 2003/0190475 A1 | * | 10/2003 | Carpenter et al. | 428/403 |
| 2004/0020327 A1 | * | 2/2004 | Hattori et al. | 75/348 |

OTHER PUBLICATIONS

"Novel Permanent Magnets and Their Uses", Materials Research Society Symp. Proc. vol. 577, 1999, pp. 255-263.

McCormick et al., "Mechanically Alloyed Nanocomposite Magnets", vol. 83, No. 11, 1998, pp. 6256-6261.

Liu, et al., "High Energy Products in Rapidly Annealed Nanoscale Fe/PT Multilayers", vol. 72, No. 4, Jan. 26, 1998, pp. 483-485.

Fullerton, et al., "Structure and Magnetic Properties of Exchange-Spring Sm-Co/Co Superlattices", vol. 72, No. 3.

Al-Omari, et al., "Magnetic Properties of Nanostructured CoSm/FeCo Films", vol. 52, No. 5, Aug. 1, 1995, pp. 3441-3447.

Kneller, et al., "The Exchange-Spring Magnet: A New Material Principle for Permanent Magnets", vol. 27, No. 4, Jul. 1991, pp. 3588-3600.

Skomski et al., "Giant Energy Product in Nanostructured Two-Phase Magnets", vol. 48. No. 21, Dec. 1, 1993, pp. 812-816.

Liu et al., "High Energy Products in Exchange-Coupled Nanocomposite Films", vol. 35, No. 5, Sep. 1998, pp. 3241-3245.

* cited by examiner

Primary Examiner—George Wyszomierski
(74) Attorney, Agent, or Firm—Wan Yee Cheung, Esq.; McGinn IP Law Group, PLLC

(57) ABSTRACT

A process of forming a hard-soft phase, exchange-coupled, magnetic nanocomposite includes forming a dispersion of magnetic nanoparticles, separating the magnetic nanoparticles from a solvent of the dispersion so as to allow self-assembly of the magnetic nanoparticles, and removing a coating from the nanoparticles, which are disposed in a self-assembled, locally-ordered nanostructure.

28 Claims, 9 Drawing Sheets

FIG.5A
FIG.5B
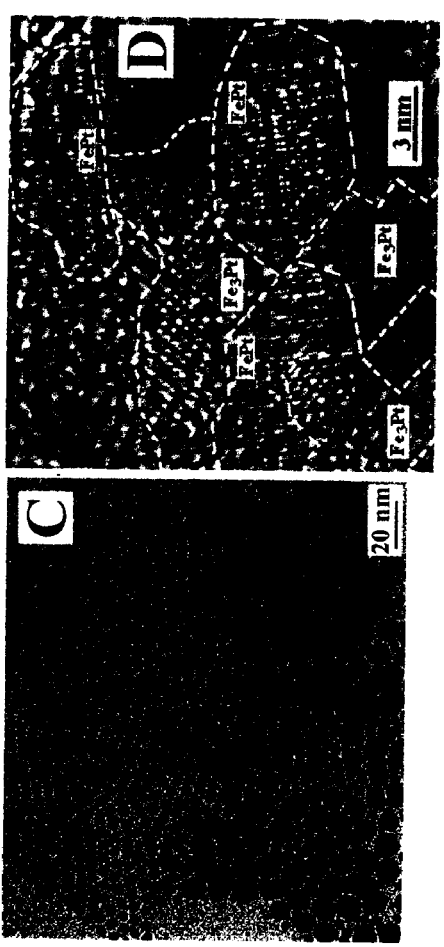
FIG.5C
FIG.5D

PROCESS OF FORMING MAGNETIC NANOCOMPOSITES VIA NANOPARTICLE SELF-ASSEMBLY

The U.S. Government has rights in the disclosed herein pursuant to DARPA Contract No. 19-01-1-0546.

BACKGROUND OF THE INVENTION

1. Field of the Invention

The present invention generally relates to a process of self-assembling multi-component or core-shell structured magnetic nanoparticles into nanocomposites. More particularly, this invention relates to a process of self-assembling magnetic nanocomposites that include magnetically hard and soft phases, which are exchange-coupled, and that possess energy products significantly higher than single-phase materials.

2. Description of the Related Art

A permanent magnet is used to provide a large magnetic field in the absence of an electric current. The field magnitude that a permanent magnet can provide is proportional to its saturation magnetization, $M_s$. An important property of a permanent magnet is retention of its magnetization in the presence of an external demagnetizing field. The property of a permanent magnet to resist a demagnetizing field is the coercivity, $H_c$. Therefore, a high-performance permanent magnet possesses both a high $M_s$ and a high $H_c$.

The energy product, $(BH)_{max}$, describes magnetic materials' ability to store magneto-static energy and is measured by the maximum value of the product of the magnetic induction, B, and the magnetic field, H, in the second quadrant of the B-H hysteresis loop. A permanent magnet with a large $(BH)_{max}$ value should exhibit both a large remanent magnetization, $M_r$, and a large coercive field, $H_c$, with a square-shaped hysteresis loop. Both $M_r$ and $H_c$ are extrinsic properties and depend not only on fundamental material properties, such as, saturation magnetization, $M_s$, and magnetocrystalline anisotropy, $K_u$, but also on morphological parameters, such as, grain size, grain spacing, and crystalline orientations.

Conventional permanent magnets are often single-phase hard magnetic materials. Hard magnetic materials, usually, binary or ternary rare-earth transition metal intermetallic compounds, possess high magnetic anisotropy that provides large coercivity, $H_c$, while their remanent magnetization, $M_r$, is relatively low when compared to some soft magnetic materials.

Soft magnetic materials, which mainly comprise Fe, Co, and their alloys, have high remanent magnetization; however, their coercivity is very small due to their low magnetocrystalline anisotropy.

If it were possible to combine the merits of both hard and soft magnetic materials in a permanent magnet, the energy product, $(BH)_{max}$, could be enhanced. Simple mixing of hard and soft magnetic materials will not produce an enhanced energy product. As shown in FIG. 1 (top), the hysteresis loop of a simple mixture of hard and soft magnetic materials is virtually a superposition of the two loops of the individual phases.

It was proposed more than a decade ago that if the phases of the hard and soft magnetic materials could be controllably modulated into a nanocomposite structure—an exchange-spring magnet having a greatly enhanced energy product could be obtained as shown in FIG. 1 (bottom).

The response of an exchange-spring magnet to an externally applied demagnetizing field is illustrated schematically in FIG. 2. In the absence of an external magnetic field, the spins of the hard and soft phases of the magnetic materials remain parallel to each other. When an externally demagnetizing field is applied, the spins of the soft phase that are the farthest from the hard phase are reversed, following the demagnetizing field. However, at the interface of the two phases, the spins of the soft phase remain parallel with those of the hard phase, due to the strong ferromagnetic exchange-coupling between these two phases. If the dimension of the soft phase can be reduced to less than twice the domain wall width of the hard phase, the two phases will respond to an external field coherently. Such a hard-soft phase modulated system exhibits both a high magnetization and high coercivity, and consequently, has an energy product, $(BH)_{max}$, that is significantly greater than that of single-phase bulk magnetic materials.

Due to the dimensional modulation requirements for effective exchange-coupling, the magnetic properties of an exchange-spring magnet are very sensitive to microstructural parameters, such as, the dimensions of the different phases and their spatial distribution in the composite material. These microstructural, in fact, nano-structural, requirements pose a tremendous challenge for material processing.

Nanocomposites refer to engineered materials that include two or more components, with at least one component having a nanometer length of scale. The properties induced by nanoscale dimensioning of component materials and nanoscale modulations of different component materials within a nanocomposite, often lead to novel nanoscale physical properties, resulting in material properties not observed in the component materials, themselves, or even elsewhere in nature.

An important example of a novel nanoscale physical property is an exchange-spring magnet that is formed by a nanocomposite, which includes exchange-coupled, magnetically hard and soft phase nanoparticles, and that is expected to show a greatly enhanced energy product, $(BH)_{max}$, for permanent bulk magnet applications.

For effective exchange coupling in a two-phase magnet, the nanoscale dimensions and structural coherency of both the magnetically hard and soft phases need to be well controlled. One of the critical requirements for effective exchange-coupling is that the dimensions of the soft magnetic grains should be smaller than twice the domain wall width of the hard magnetic grains, that is, about 10 nm.

Various conventional techniques, including melt-spinning, mechanical milling, and sputtering, have been explored to prepare exchange-spring magnets for potential applications or for modeling studies of multilayer films. However, these approaches have had very limited success in producing uniform magnetic grain sizes down to a few nanometers and in controlling the spatial distribution of the magnetic hard and soft phases within a nanocomposite. Therefore, a process of producing a nanocomposite with a high degree of control for grain sizes, grain size distributions, and inter-grain interactions, especially, for each of the hard and soft magnetic phases, is essential for both a fundamental understanding and practical fabrication of high performance permanent magnets.

In order to overcome the problems of conventional techniques in producing an effective exchange-spring magnet from a nanocomposite, chemical processing has proven to be a reliable approach to produce component nanoparticles with a uniform size and size distribution. Monodisperse nanoparticles with sizes of from about 1 to about 100 nm can serve as nanoscale building blocks for various nanostructures.

SUMMARY OF THE INVENTION

In view of the foregoing and other problems and disadvantages of conventional techniques, an aspect of the present invention is a process that uses highly controlled nanoparticle sizes and nanoparticle size distributions, especially, for hard and soft magnetic phase materials, to produce a self-assembled, exchange-coupled, magnetic nanocomposite.

Another aspect of the present invention is a process that uses core-shell structured nanoparticles, where the core and the shell comprise complementary hard and soft magnetic phase materials, to produce a self-assembled, exchange-coupled magnetic nanocomposite.

A further aspect of the present invention is the formation of an exchange-coupled magnetic nanocomposite by removing a coating from magnetic nanoparticles that are disposed in a self-assembled, locally-ordered structure.

In order to attain the above and other aspects, according to an exemplary embodiment of the present invention, disclosed herein is a process of forming a multi-component nanoparticle self-assembly that includes forming a first dispersion including nanoparticles of a first component, forming a second dispersion including nanoparticles of a second component, mixing the first and the second dispersions to form a mixed dispersion, and removing a solvent from the mixed dispersion, in which removing the solvent results in a self-assembly of the nanoparticles of the first and the second components in a locally-ordered nanostructure.

According to another exemplary embodiment of the present invention, the first component comprises a soft magnetic material and the second component comprises a hard magnetic material.

According to another exemplary embodiment of the present invention, the nanoparticles of the first component and the nanoparticles of the second component are each surrounded by a coating that prevents agglomeration of the nanoparticles in the first, the second, and the mixed dispersions.

According to another exemplary embodiment of the present invention, the soft magnetic material comprises at least one of Co, Fe, Ni, CoFe, NiFe, CoO, $Co_2O_3$, FeO, $Fe_2O_3$, $Fe_3O_4$, NiO and other related oxides, including ferrites, and the hard magnetic material comprises at least one of CoPt, FePt, SmCo-based alloys, including $SmCo_5$, $Sm_2Co_{17}$, and $SmCo_7$, and rare earth-FeB-based alloys, including Nd—FeB and Pr—FeB.

According to another exemplary embodiment of the present invention, the solvent comprises at least one of water, alcohols, ketones, aldehydes, ethers, esters, hydrocarbons, aromatics, organic halides, and other substituted organic solvents.

According to another exemplary embodiment of the present invention, a process of forming a core-shell structured nanoparticle self-assembly that includes forming a dispersion including core-shell structured nanoparticles, and removing a solvent from the dispersion, in which removing the solvent results in a self-assembly of the core-shell structured nanoparticles in a locally-ordered nanostructure.

According to another exemplary embodiment of the present invention, a core and a shell of each of the core-shell structured nanoparticles comprise complementary hard and soft magnetic materials.

According to another exemplary embodiment of the present invention, the core-shell structured nanoparticles are each surrounded by a coating that prevents agglomeration of the core-shell structured nanoparticles in the dispersion.

According to another exemplary embodiment of the present invention, a soft core, hard shell, core-shell structured nanoparticle comprises a soft core diameter comparable to a domain wall width of a hard phase in an exchange-coupled, magnetic nanocomposite, which is about 10 nm to about 20 nm.

According to another exemplary embodiment of the present invention, a hard core, soft shell, core-shell structured nanoparticle comprises a soft shell with a thickness comparable to a domain wall width of a hard phase in an exchange-coupled, magnetic nanocompsite, which is about 10 nm to about 20 nm.

According to another exemplary embodiment of the present invention, the soft magnetic material comprises at least one of Co, Fe, Ni, CoFe, NiFe, CoO, $Co_2O_3$, FeO, $Fe_2O_3$, $Fe_3O_4$, NiO, and other related oxides, including ferrites, and the hard magnetic material comprises at least one of CoPt, FePt, SmCo-based alloys, including $SmCo_5$, $Sm_2Co_{17}$, and $SmCo_7$, and rare earth-FeB-based alloys, including Nd—FeB and Pr—FeB.

According to another exemplary embodiment of the present invention, the solvent comprises at least one of water, alcohols, ketones, aldehydes, ethers, esters, hydrocarbons, aromatics, organic halides, and other substituted organic solvents.

According to another exemplary embodiment of the present invention, a process of forming an exchange-coupled magnetic nanocomposite that includes removing a coating from a plurality of magnetic nanoparticles that are disposed in a self-assembled, locally-ordered nanostructure to form a hard-soft, exchange-coupled nanocomposite.

According to another exemplary embodiment of the present invention, the hard-soft, exchange-coupled nanocomposite comprises a soft magnetic phase including one of Co, Fe, Ni, CoFe, NiFe, CoO, $Co_2O_3$, FeO, $Fe_2O_3$, $Fe_3O_4$, NiO, and other related oxides, including ferrites and a hard magnetic phase including one of CoPt, FePt, SmCo-based alloys, including $SmCo_5$, $Sm_2Co_{17}$, and $SmCo_7$, and rare earth-FeB-based alloys, including Nd—FeB and Pr—FeB.

According to another exemplary embodiment of the present invention, the coating comprises an organic or inorganic volatile matrix that is volatilized by an energetic process.

According to another exemplary embodiment of the present invention, removing comprises an annealing process performed under reducing conditions, including hydrogen gas and an inert gas, carbon monoxide, or alkali and alkaline earth metals.

According to another exemplary embodiment of the present invention, removing comprises an annealing process performed under at least one of an energetic beam irradiation, a magnetic field, an electric field, a pressure, and a stress.

According to another exemplary embodiment of the present invention, the reducing conditions are maintained in a reaction vessel under vaccum.

According to another exemplary embodiment of the present invention, a temperature of the annealing process includes from about 100° C. to about 1000° C.

According to another exemplary embodiment of the present invention, a temperature of the annealing process includes from about 500° C. to about 800° C.

According to another exemplary embodiment of the present invention, a process of forming an exchange-coupled magnetic nanocomposite that includes removing a coating from a plurality of magnetic nanoparticles that are disposed in a self-assembled, locally-ordered nanostructure to form a hard-soft, exchange-coupled nanocomposite, further includes mechanically compacting the hard-soft, exchange-coupled nanocomposite to obtain a higher-density, hard-soft, exchange-coupled nanocomposite that is substantially devoid of spaces between magnetic materials.

Thus, the present invention overcomes the problems of conventional techniques, such as, melt-spinning, mechanical milling, and sputtering, to prepare exchange-spring magnets because these techniques have very limited success in producing uniform magnetic grain sizes down to a few nanometers and in controlling the spatial distribution of the magnetic hard and soft phases within a nanocomposite.

BRIEF DESCRIPTION OF THE DRAWINGS

The foregoing and other aspects and advantages will be better understood from the following detailed description of preferred embodiments of the invention with reference to the drawings, in which:

FIG. 5A shows a transmission electron microscopic (TEM) bright field image of a binary self-assembly of $Fe_3O_4$ (particle size=4 nm): $Fe_{58}Pt_{42}$ (particle size=4 nm) nanoparticles in an exemplary embodiment of the present invention;

FIG. 5B shows a TEM bright field image of a binary self-assembly of $Fe_3O_4$ (particle size=8 nm): $Fe_{58}Pt_{42}$ (particle size=4 nm) nanoparticles in an exemplary embodiment of the present invention;

FIG. 5C shows a TEM bright field image of a binary self-assembly of $Fe_3O_4$ (particle size=12 nm): $Fe_{58}Pt_{42}$ (particle size=4 nm) nanoparticles in an exemplary embodiment of the present invention;

FIG. 5D shows a typical high resolution (HR) TEM image of an FePt: $Fe_3Pt$ nanocomposite resulting from an annealed self-assembly of $Fe_3O_4$ (particle size=4 nm): $Fe_{58}Pt_{42}$ (particle size=4 nm) nanoparticles in an exemplary embodiment of the present invention;

DETAILED DESCRIPTION OF THE PREFERRED EMBODIMENTS OF THE INVENTION

Figure 1:
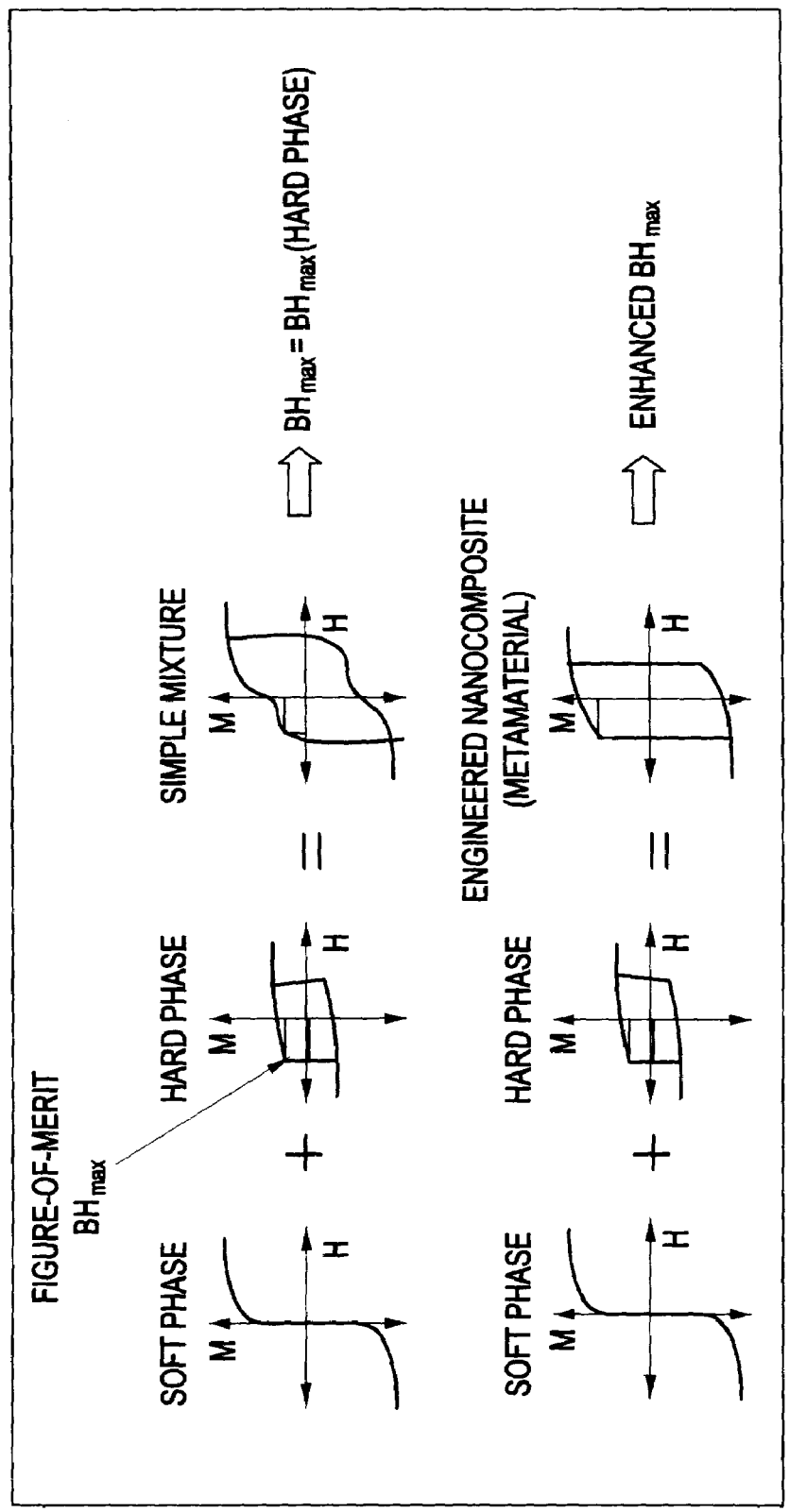
FIG. 1 illustrates hysteresis loop behaviors of a simple composite of hard and soft magnetic materials (top); and an engineered nanocomposite (bottom)
Figure 2:
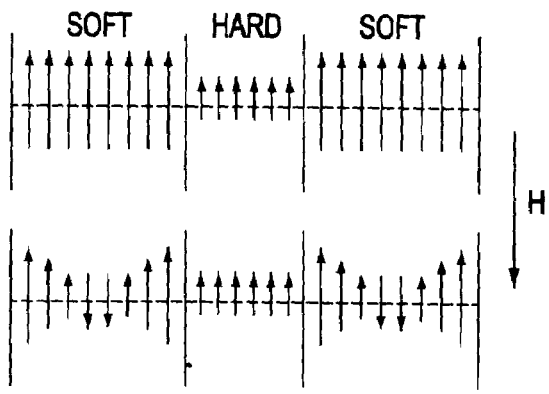
FIG. 2 illustrates schematically the response of exchange-coupled, magnetically hard and soft phases to an external magnetic field.

Generally, the present invention takes advantage of chemical processing techniques, which have proven to be an efficient way of making nanoparticles with a controlled size, size distribution, and composition.

In various exemplary embodiments, at least two types of nanoparticles, having different magnetic properties, for example, hard and soft phase magnetic materials, may be selected to provide a self-assembling magnetic nanocomposite. Each of the selected nanoparticle types, having a controlled size and size distribution, may be coated to prevent agglomeration of the nanoparticles within a dispersion. Each of the coated nanoparticles may then be dispersed within a solvent, to form a stable dispersion. The dispersions of the at least two types of coated nanoparticles may be mixed. The solvent of the mixed nanoparticle dispersion and the nanoparticles may be separated to allow subsequent close-packing and self-assembly of the magnetic nanoparticles.

By varying the concentration of the different dispersions, the relative mass ratio of the selected nanoparticle materials may be readily controlled in various exemplary embodiments. After separation from the solvent, the self-assembled magnetic nanoparticles are usually held together by very weak van der Waals and magnetostatic interactions. The self-assembled nanoparticles do not exhibit exchange-coupling at this stage, since the inter-particle distances are much larger than that which is required for exchange-coupling, that is, a few atomic spacings.

In various exemplary embodiments, to make a more compact nanoparticle self-assembly, the self-assembled nanoparticles may be annealed. During the annealing process, the coating that surrounds the individual magnetic nanoparticles may be removed, leaving naked nanoparticles that allow for direct contact with each other and partial inter-diffusion between different nanoparticles in the assembly. This compaction may result in a nanocomposite system with the magnetic phase materials being exchange-coupled to form an exchange-spring magnet.

In various exemplary embodiments, core-shell structured nanoparticles may be used to form a magnetic nanocomposite. The core-shell structured nanoparticles may comprise a core particle, which has different magnetic properties, than the surrounding shell. For example, the core particle may comprise a hard magnetic material, while the shell may comprise a soft magnetic material, or the core material may comprise a soft magnetic material, while the shell may comprise a hard magnetic material. The magnetic core-shell structured nanoparticles may be coated to prevent agglomeration of the nanoparticles within a dispersion. Magnetic core-shell structured nanoparticles may be dispersed in a solvent and then separated from the solvent to allow self-assembly. In various exemplary embodiments, compaction of the self-assembled magnetic core-shell structured nanoparticles may be accomplished by removing the coating layer. This compaction may result in a magnetic nanocomposite system with the magnetic phases being exchange-coupled to form an exchange-spring magnet.

Figure 3A:
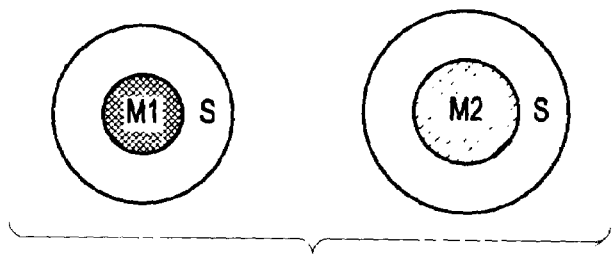
FIG. 3A illustrates schematically two different magnetic nanoparticles: M1 and M2, each with a coating, S, in an exemplary embodiment of the present invention.

As illustrated in FIG. 3A, two magnetic materials, for example, FePt and $Fe_3O_4$, may each comprise nanoparticles of a selected size, which may each then be coated. In various exemplary embodiments, the two or more magnetic materials may comprise, for example, soft magnetic materials, such as, but not limited to the metals Co, Fe, Ni, CoFe, NiFe, CoFe, NiFe, CoO, Co2O3, FeO, Fe2O3, Fe3O4, NiO and other related oxides, including ferrites, and hard magnetic materials, such as, but not limited to CoPt, FePt, SmCo-based alloys, including SmCo5, Sm2Co17, and SmCo7, and rare earth-FeB-based alloys, including Nd—FeB and Pr—FeB. The magnetic materials may be formed from nanoparticles of a selected size by mixing two different dispersions, followed by, for example, solvent evaporation and other processes well known in the art. An organic coating, for example, oleic acid, or an inorganic coating may be applied to the nanoparticles to prevent agglomeration of the nanoparticles within a dispersion. In various exemplary embodiments, each solvent of the two or more dispersions may include, but is not limited to, water or various organic solvents, such as, alcohols, ketones, aldehydes, ethers, esters, hydrocarbons, aromatics, organic halides, and other substituted organic solvents, or a mixture of any of these solvents.

In an exemplary embodiment of the present invention, the nanoparticles of two magnetic materials, such as, FePt and $Fe_3O_4$, may be coated with an organic coating, such as, oleic acid, and may be dispersed in an organic solvent, such as, hexane, to form two magnetic material dispersions. Each of these two dispersions may have a selected concentration and volume, so that, when the two dispersions are mixed, a selected mass ratio for the two magnetic materials may be obtained. In various exemplary embodiments, the two dispersions may be mixed, with ultrasonic agitation or other mixing processes well known in the art, to assure adequate dispersion of the FePt and $Fe_3O_4$ nanoparticles throughout the mixed dispersion. This rational mixing of two magnetic materials may control the final composition of the magnetic nanocomposite.

Figure 3B:
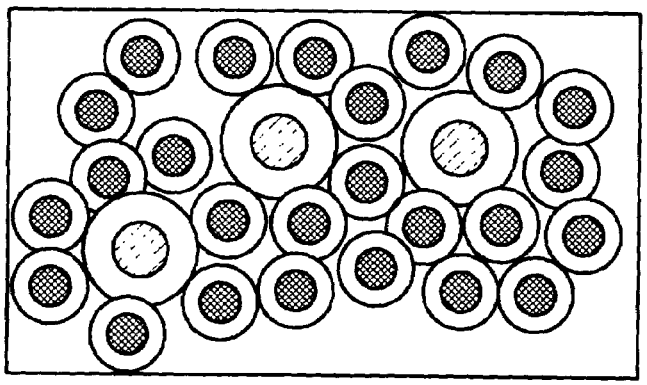
FIG. 3B illustrates schematically the self-assembly of the M1 and M2 nanoparticles after removal of the solvent from the mixed dispersion in an exemplary embodiment of the present invention.

In an exemplary embodiment of the present invention, the hexane solvent of the mixed dispersion may be separated from the coated nanoparticles by, for example, precipitation through interaction of added compounds with the coating material or evaporation. After separation of the magnetic nanoparticles from the solvent of the mixed dispersion, the FePt and $Fe_3O_4$ magnetic nanoparticles may form a self-assembly as shown in FIG. 3B.

Figure 3C:
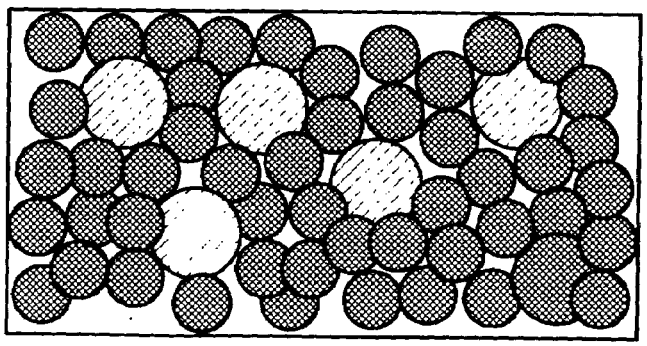
FIG. 3C illustrates schematically the formation of the M1–M2 nanocomposite from the self-assembled M1 and M2 nanoparticles after annealing under a reducing atmosphere or under partial vacuum with mixed gas flow to remove the coating in an exemplary embodiment of the present invention.

FIG. 3C illustrates a process, for example, annealing under a vacuum with a mixed gas flow that may remove the coating around each nanoparticle, allowing the self-assembled nanoparticles particles to be in direct contact and further, to partially inter-diffuse, which may lead to an exchange-coupled magnetic nanocomposite.

Figure 4A:
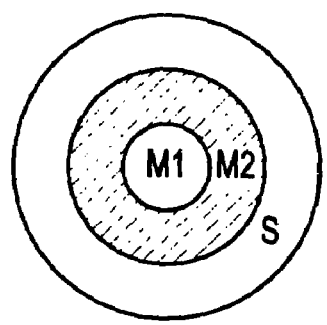
FIG. 4A illustrates schematically a core-shell structured nanoparticle including: a core, M1; a shell, M2; and an outer coating, S, in an exemplary embodiment of the present invention.

In another exemplary embodiment of the present invention, FIG. 4A illustrates a core-shell structured nanoparticle with a core of magnetic material, M1, and a shell of magnetic material, M2, which is coated with a coating layer, S. In various exemplary embodiments, the core material, M1, may possess complementary magnetic properties to those of shell material, M2 . For example, the core may comprise a hard magnetic material, such as, but not limited to CoPt, FePt, SmCo-based alloys, including $SmCo_5$, $Sm_2Co_{17}$, and $SmCo_7$, and rare earth-FeB-based alloys, including Nd—FeB and Pr—FeB, while the shell may comprise a soft magnetic material, such as, but not limited to the metals Co, Fe, Ni, CoFe, NiFe, CoFe, NiFe, CoO, $Co_2O_3$, FeO, $Fe_2O_3$, $Fe_3O_4$, NiO and other related oxides, including ferrites, or the core may comprise a soft magnetic material, while the shell may comprise a hard magnetic material.

In an exemplary embodiment of the present invention, a core-shell structured nanoparticle having a soft core and a hard shell may comprise a soft core diameter comparable to a domain wall width of a hard phase in an exchange-coupled, magnetic nanocomposite, which is about 10 nm to about 20 nm, while a core-shell structured nanoparticle having a hard core and a soft shell may comprise a soft shell with a thickness comparable to a domain wall width of a hard phase in an exchange-coupled, magnetic nanocomposite, which is about 10 nm to about 20 nm.

Figure 4B:
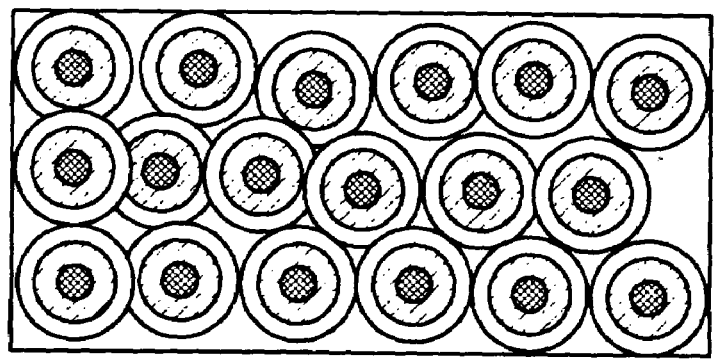
FIG. 4B illustrates schematically the self-assembled core-shell structured nanoparticles after removal of solvent in an exemplary embodiment of the present invention.

As illustrated in FIG. 4B, the core-shell structured nanoparticles may self-assemble.

Figure 4C:
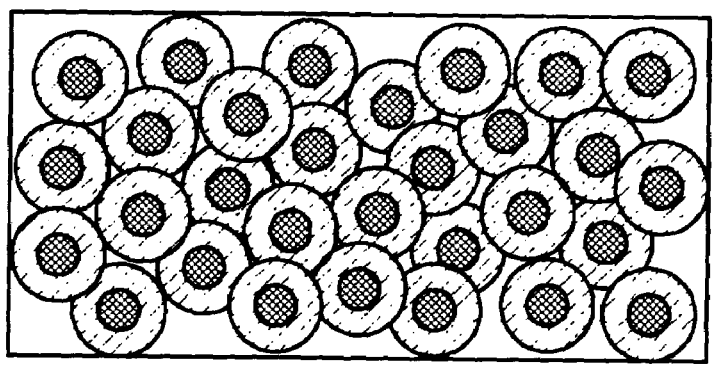
FIG. 4C illustrates schematically the formation of the M1–M2 nanocomposite from the self-assembled core-shell structured nanoparticles after annealing under a reducing atmosphere or under partial vacuum with mixed gas flow removes the coating in an exemplary embodiment of the present invention.

FIG. 4C illustrates the result of an annealing process that may remove the coating around each core-shell structured nanoparticle; thus, allowing the core-shell structured nanoparticles to be in direct contact and further, to partially inter-diffuse, which may lead to an exchange-coupled magnetic nanocomposite.

FIG. 5 shows TEM bright field images of the binary composite assemblies of (A) $Fe_3O_4$(4 nm):$Fe_{58}Pt_{42}$(4 nm); (B) $Fe_3O_4$(8 nm):$Fe_{58}Pt_{42}$(4 nm); (C) $Fe_3O_4$(12 nm): $Fe_{58}Pt_{42}$(4 nm), and (D) a typical HRTEM image of an FePt:$Fe_3$Pt nanocomposite derived from annealed $Fe_3O_4$(4 nm):$Fe_{58}Pt_{42}$(4 nm) assembly. The binary assemblies in FIGS. 5A–C have a fixed mass ratio for 1:10. Depending on the sizes of the nanoparticles, three different assembly structures may be observed. FIG. 5A shows that $Fe_3O_4$ (particle size=4 nm) and $Fe_{58}Pt_{42}$ (particle size= 4 nm) may self-assemble to randomly occupy sites of a hexagonal lattice, while FIG. 5B shows that $Fe_3O_4$ (particle size=8 nm) and $Fe_{58}Pt_{42}$ (particle size=4 nm) may self-assemble to provide a local ordering in which each big particle of $Fe_3O_4$ may be surrounded by 6–8 small particles of $Fe_{58}Pt_{42}$.

However, as shown in FIG. 5C, large differences of nanoparticle sizes in a self-assembly, for example, as in a self-assembly of $Fe_3O_4$ (particle size=12 nm) and $Fe_{58}Pt_{42}$ (particle size=4 nm), may result in a phase segregation with the 12 nm and 4 nm nanoparticles clearly forming their own respective superlattice arrays. The particular ordered structure of the assembly, and thus, the modulation of the hard and soft phases within a composite, may depend primarily on the particle sizes and may be insensitive to the mass ratio ranges studied.

Figure 6:
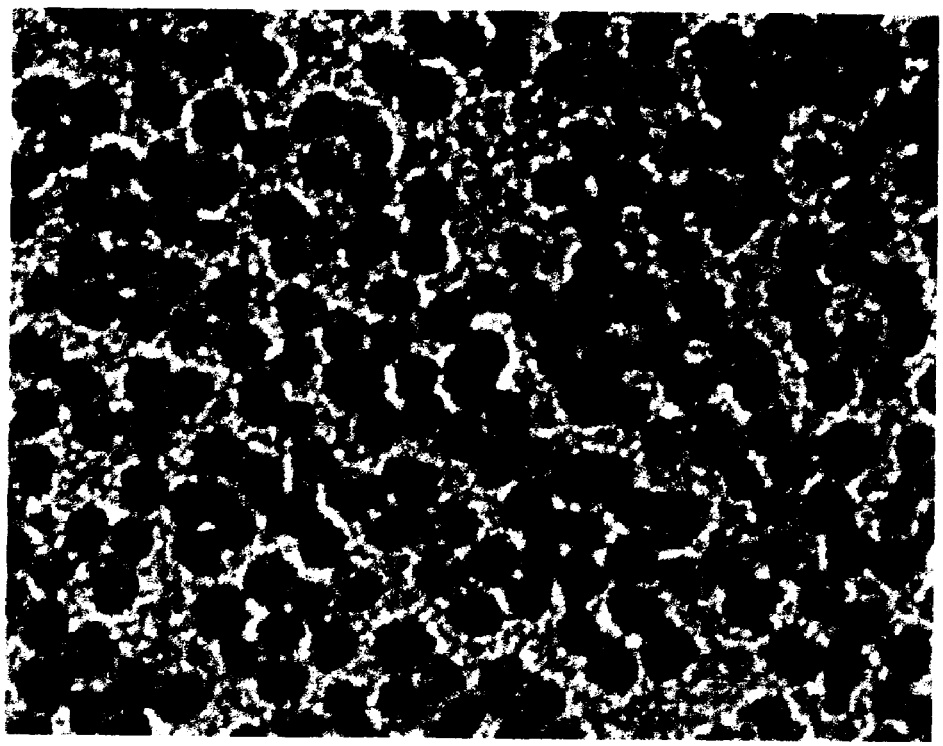
FIG. 6 shows a TEM image of a FePt core and $Fe_3O_4$ shell of a core-shell structured FePt)$Fe_3O_4$ nanoparticle self-assembly, where the Bar=12 nm, in an exemplary embodiment of the present invention.

In contrast to the binary self-assembly, above, where a particular ordered structure may depend on the ratio of the component nanoparticle sizes, the phase modulation of a composite from a self-assembled core-shell nanoparticle assembly may depend on the size of the core and the thickness of the shell. In various exemplary embodiments, each core-shell structured nanoparticle, M1)M2, may serve as a single building block to the self-assembly, which allows for a homogeneous distribution of the two magnetic phases, in the nanocomposite. Such a uniform phase modulation is shown, for example, in FIG. 6, which shows a TEM image of an FePt)$Fe_3O_4$ self-assembly of core-shell structured nanoparticles.

In various exemplary embodiments, the binary $Fe_3O_4$:$Fe_{58}Pt_{42}$ self-assemblies may be converted into corresponding FePt—$Fe_3Pt$ nanocomposites by annealing under a vacuum with a gas flow mixture of argon gas (Ar), or any other comparable inert gas well known in the art, and hydrogen gas ($H_2$), where the hydrogen gas may comprise from about 5% to about 100% of the gas flow mixture.

In the presence of hydrogen gas, annealing may reduce iron oxide to iron and transforms the FePt from a disordered face-centered cubic (fcc) structure to an ordered face-centered tetragonal (fct) structure that possesses a high magnetocrystalline anisotropy (>$5 \times 10^7$ erg/$cm^3$), providing large coercivity, $H_c$, in the magnetic nanocomposite. Annealing under vacuum with a gas flow mixture may also desorb the coating around each particle, allowing the nanoparticles to sinter. In various exemplary embodiments, the annealing process may be performed under reducing conditions that include hydrogen gas and an inert gas, carbon monoxide, or alkali and alkaline earth metals. Such reducing conditions may, for example, be maintained in a reaction chamber under vacuum. The annealing process may also, for example, be performed with an energetic beam irradiation, a magnetic field, an electric field, a pressure, or a stress. In various exemplary embodiments, annealing may require temperatures from about 100° to about 1000° C., and preferably temperatures from about 500° to about 800° C.

In various exemplary embodiments, after annealing under vacuum with a reducing atmosphere, the partial inter-diffusion between Fe and FePt may create a new fcc structured phase of $Fe_3Pt$, which is magnetically soft and possesses high magnetization. FIG. 5D shows a typical high-resolution TEM image of an annealed and sintered sample obtained from a binary self-assembly of $Fe_3O_4$ and $Fe_{58}Pt_{42}$ nanoparticles of 4 m sizes as shown in FIG. 5A. Structural analysis of the annealed and sintered sample reveals that the coalesced nanoparticles are divided into two distinct phases with dimensions on the order of 5 nm: (1) an fct FePt phase that is magnetically hard, and (2) an fcc $Fe_3Pt$ phase that is magnetically soft. Elemental analysis from spatially resolved Energy Dispersive Spectroscopy (EDS) confirms the existence of the two phases with composition ratios of Fe:Pt corresponding to approximately 1:1 and 3:1.

After examining various experimental samples of annealed FePt—$Fe_3Pt$ nanocomposites resulting from ratios of $Fe_3O_4$:$Fe_{58}Pt_{42}$ corresponding to 4 nm:4 nm particle sizes and corresponding to 4 nm:8 nm particle sizes, the inventors found that: (a) the $Fe_3Pt$ phase may be uniformly dispersed within the FePt matrix; (b) the dimensions of the $Fe_3Pt$ phase may be below 10 nm; and (c) the c-axis of the fct FePt phase may be randomly oriented, indicating that the resulting nanocomposite is isotropic. Trace amounts of α-Fe may be likely to exist in the nanocomposite resulting from ratios of $Fe_3O_4$:$Fe_{58}Pt_{42}$ corresponding to 8 nm:4 nm particle sizes as suggested by both TEM and EDS analyses. In the experimental samples of annealed nanocomposites resulting from ratios of $Fe_3O_4$:$Fe_{58}Pt_{42}$ corresponding to 12 nm:4 nm particle sizes, however, large α-Fe particles of over 20 nm in diameter are observed, due to the phase segregation as observed in the sample preparation of FIG. 5C.

Figure 7:
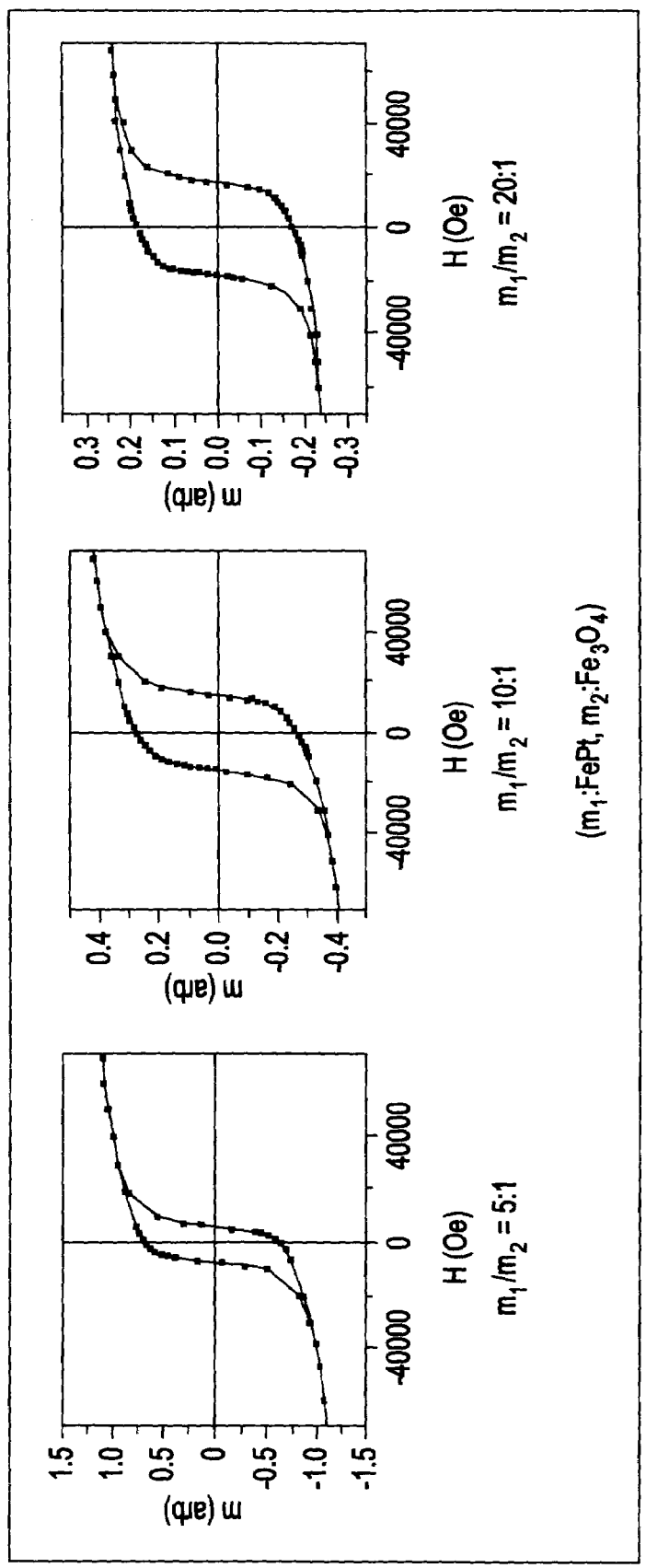
FIG. 7 shows magnetic hysteresis loops of the composites resulting from binary assemblies with different initial mass ratios of $Fe_3O_4$ (particle size=4 nm) and $Fe_{58}Pt_{42}$ (particle size=4 nm) nanocomposites in an exemplary embodiment of the present invention.

Magnetic properties of FePt—$Fe_3Pt$ nanocomposites may vary with different initial mass ratios of $Fe_3O_4$ and $Fe_{58}Pt_{42}$. FIG. 7 shows magnetic hysteresis loops with different mass ratios of $Fe_3O_4$ (particle size=4 nm) and $Fe_{58}Pt_{42}$ (particle size=4 nm) nanoparticles after thermal annealing under a gas mixture of, for example, 95% Ar and 5% $H_2$ at 650° C. for 1 hour for corresponding exemplary embodiments of the present invention.

Figure 8:
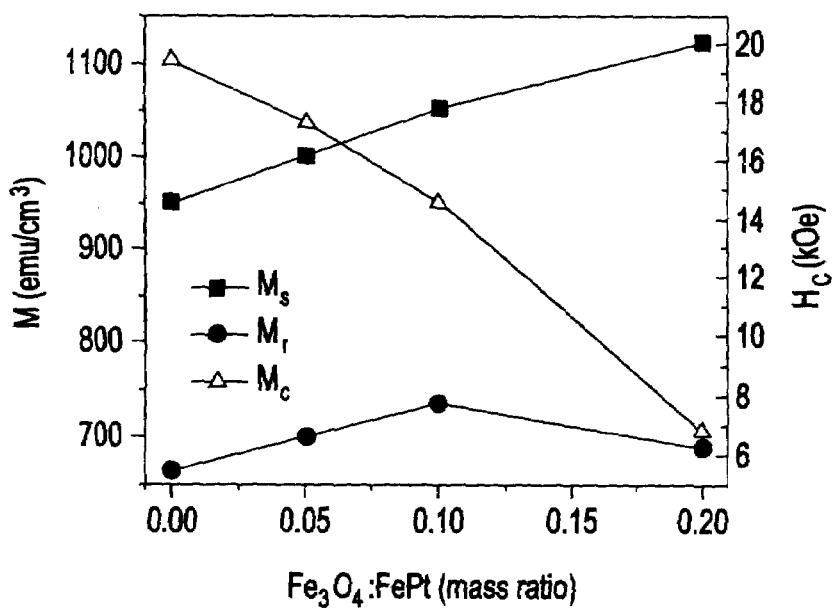
FIG. 8 shows coercivity, $H_c$, saturation magnetization, $M_s$, and remanent magnetization, $M_r$ of the nanocomposite as a function of the initial mass ratio of $Fe_3O_4$ and $Fe_{58}Pt_{42}$ in an exemplary embodiment of the present invention.

FIG. 8 shows the saturation magnetization, ($M_s$), remanent magnetization, ($M_r$), and coercivity, ($H_c$), of the FePt—$Fe_3Pt$ nanocomposites resulting from the $Fe_3O_4$ (particle size=4 nm) and $Fe_{58}Pt_{42}$ (particle size=4 nm) binary assemblies as a function of the initial $Fe_3O_4$:$Fe_{58}Pt_{42}$ mass ratios of for corresponding exemplary embodiments of the present invention. It may be seen that $M_s$ increases monotonically from 950 emu/$cm^3$ for pure FePt, to 1110 emu/$cm^3$, which corresponds to an $Fe_3O_4$:$Fe_{58}Pt_{42}$ mass ratio of 0.20. $M_r$ shows a maximum of 740 emu/$cm^3$ at a 1:10 mass ratio, a 17% increase from pure FePt. Thus, the remanence ratio, $M_r/M_s$, over the initial mass ratio range for all of these FePt—$Fe_3Pt$ nanocomposite samples may be greater than 0.6. Although each nanocomposite sample includes both magnetically hard and soft phases, the hysteresis loop measurements show that the magnetization changes smoothly with changes in the external magnetic field, similar to the loop behavior measured from a single-phase FePt. From these findings together with an enhanced remanence ratio, when compared to a remanence ratio of 0.5 for an isotropic non-exchange-coupled system, it may be concluded that exchange-coupling between the two phases is realized in these magnetic nanocomposites.

Figure 9:
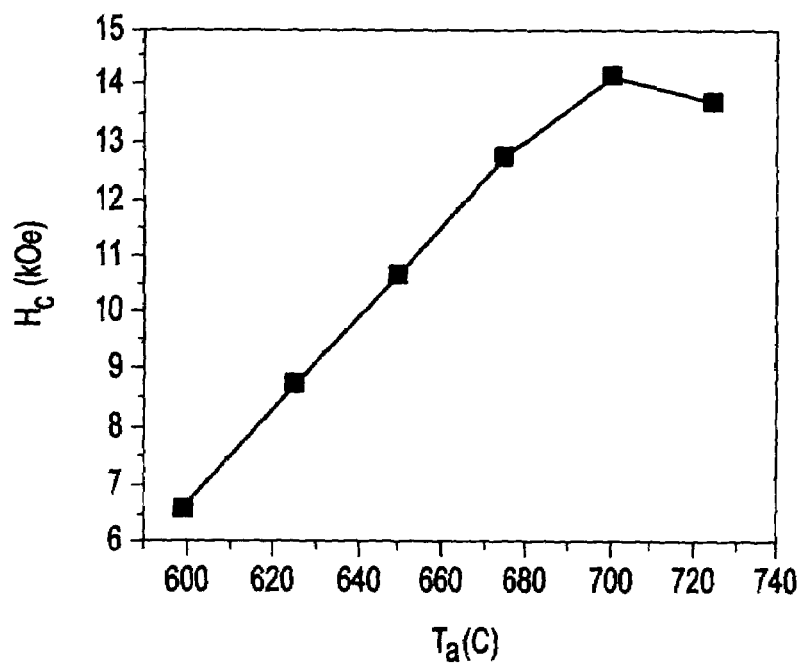
FIG. 9 shows annealing temperature dependent coercivity, $H_c$, of the nanocomposite resulting from a $Fe_3O_4$ (particle size=4 nm): $Fe_{58}Pt_{42}$ (particle size=4 nm) binary self-assembly with a mass ratio of 1:10 in an exemplary embodiment of the present invention.

In various exemplary embodiments, it may be observed that for a fixed mass ratio, the coercivity, $H_c$, is dependent on the annealing temperature, $T_a$, because annealing may determine the chemical ordering and the extent of exchange-coupling, and thus, the coercivity of the nanocomposites. For example, FIG. 9 shows an annealing temperature dependent coercivity, $H_c$, of the nanocomposite resulting from a $Fe_3O_4$ (particle size=4 nm) and a $Fe_{58}Pt_{42}$ (particle size=4 nm) binary assembly with a fixed mass ratio of 1:10. As further shown in FIG. 9, $H_c$ may initially increase as $T_a$ increases from about 600° C. to about 700° C., reaching a maximum coercivity of about 19 kOe at about 700° C., and then may decrease with further increasing $T_a$. The observed increase of $H_c$ with increasing $T_a$, below 700° C., may be primarily due to the improvement of the chemical ordering of the FePt particles, which leads to an increase of the magnetocrystalline anisotropy, $K_u$. However, too high of an annealing temperature, for example, significantly above 700° C., will eventually lead to agglomerations and the formation of magnetic domains that reduce the coercivity.

Figure 10C:
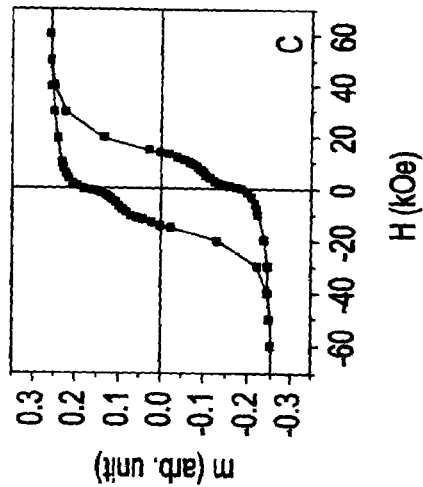
FIG. 10 shows hysteresis loops of the nanocomposites self-assembled from: $Fe_3O_4$ (particle size=4 nm): $Fe_{58}Pt_{42}$ (particle size=4 nm); $Fe_3O_4$ (particle size=8 nm): $Fe_{58}Pt_{42}$ (particle size=4 mm); and $Fe_3O_4$ (particle size=12 nm): $Fe_{58}Pt_{42}$ (particle size=4 nm) binary self-assemblies with a mass ratio of 1:10 in an exemplary embodiment of the present invention.
Figure 10B:
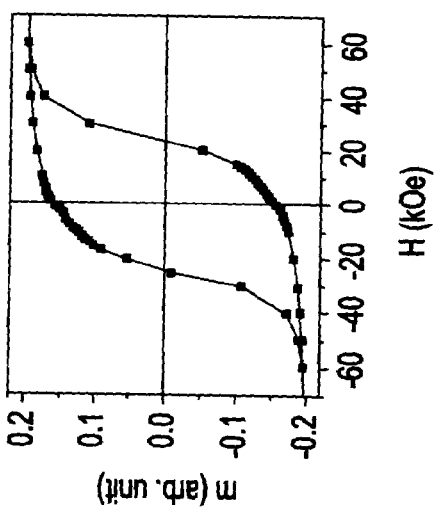
Figure 10A:
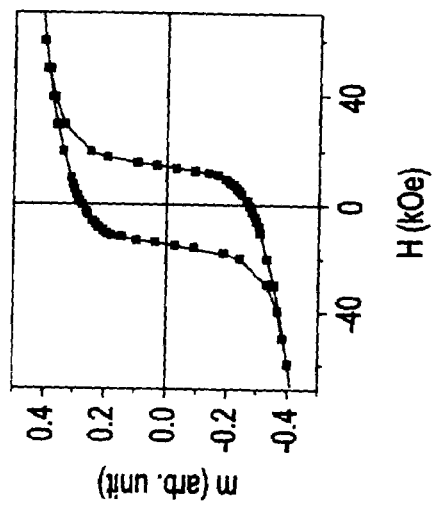

In various exemplary embodiments, the magnetic behavior of FePt—Fe$_3$Pt nanocomposites changes significantly with the initial sizes of Fe$_3$O$_4$ and Fe$_{58}$Pt$_{42}$ nanoparticles. FIGS. 10A–C show hysteresis loops of such FePt—Fe$_3$Pt nanocomposites that may result, for example, from the following initial size ratios of Fe$_3$O$_4$ and Fe$_{58}$Pt$_{42}$ nanoparticles: (A) Fe$_3$O$_4$ (particle size=4 nm):Fe$_{58}$Pt$_{42}$ (particle size=4 nm), (B) Fe$_3$O$_4$ (particle size=8 nm): Fe$_{58}$Pt$_{42}$ (particle size=4 nm), and (C) Fe$_3$O$_4$ (particle size=12 nm): Fe$_{58}$Pt$_{42}$ (particle size=4 nm), each with an initial mass ratio of 1:10. Hysteresis loops of the nanocomposites resulting from Fe$_3$O$_4$:Fe$_{58}$Pt$_{42}$ nanoparticle size ratios of 4 nm:4 nm and 8 nm:4 nm, respectively, may show single-phase-like loops with an H$_c$ of about 14 and 24 kOe as shown in FIGS. 10A and 10B, respectively, and an enhanced remanence. On the other hand, a hysteresis loop of the nanocomposite resulting from a nanoparticle assembly of Fe$_3$O$_4$ (particle size=12 nm) and Fe$_{58}$Pt$_{42}$ (particle size=4 nm), shows a kink in the loop at low values of the external magnetic field as shown in FIG. 10C.

These differences in hysteresis loop behavior may correlate directly to the particle size dependent self-assembly nanostructures observed in the TEM images of FIGS. 5A–C, respectively. For the Fe$_3$O$_4$ (particle size=4 nm):Fe$_{58}$Pt$_{42}$ (particle size=4 nm) self-assembly as shown in FIG. 5A and the Fe$_3$O$_4$ (particle size=8 nm):Fe$_{58}$Pt$_{42}$ (particle size=4 nm) self-assembly as shown in FIG. 5B, the two sizes of nanoparticles particles are well mixed locally. Such self-assemblies may lead to spatially-modulated Fe$_3$Pt soft and FePt hard phases in the annealed nanocomposite with the soft phase grains limited to less than 10 nm in size, as confirmed by the HRTEM image of FIG. 5D. On the other hand, the hysteresis loop behavior from the Fe$_3$O$_4$ (particle size=12 nm) and Fe$_{58}$Pt$_{42}$ (particle size=4 nm) assembly as shown in FIG. 5C, may be due to the spatial segregation of the Fe$_{58}$Pt$_{42}$ and Fe$_3$O$_4$ nanoparticles, which may result from the formation of large Fe particles of over 20 nm in diameter. As explained above, in order for effective exchange-coupling to occur within a two-phase magnet, the dimensions of the soft phase grains should be smaller than about 10 nm. Therefore, in a nanocomposite with large soft phase grains as shown in FIG. 5C, hard and soft phases may be exchange-decoupled. As a result, the hysteresis loop of a nanocomposite with large soft phase grains may show the decoupled two-phase loop behavior of FIG. 10C.

Figure 11:
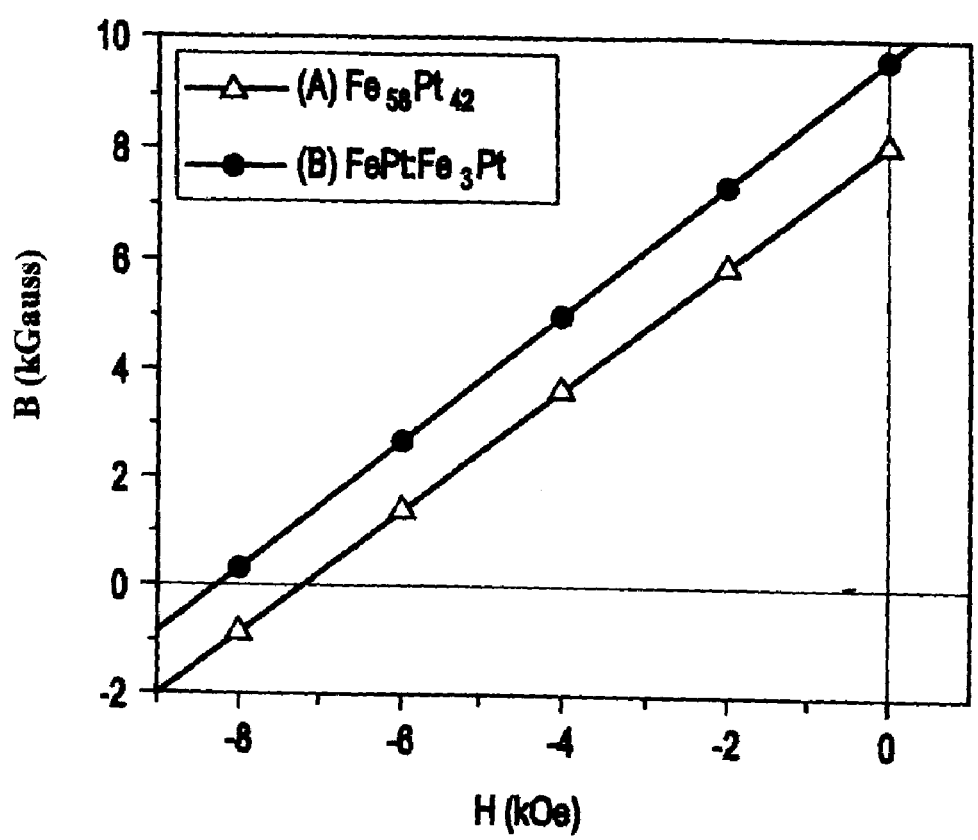
FIG. 11 illustrates two B-H curves: (A) of an exchange-coupled, single phase, FePt (particle size=4 nm) nanoparticle assembly, and (B) of an exchange-coupled, hard and soft phases, nanocomposite resulting from an $Fe_3O_4$ (particle size=4 nm): $Fe_{58}Pt_{42}$ (particle size= 4 nm) binary self-assembly with a mass ratio of 1:10 in an exemplary embodiment of the present invention.

The optimal nanostructures for exchange-coupling yield both high remanent magnetization and coercivity, resulting in an enhanced energy product (BH)$_{max}$. FIG. 11A illustrates an experimental B-H curve of an exchange-coupled, single phase Fe$_{58}$Pt$_{42}$ (particle size=4 nm) nanoparticle assembly, while FIG. 11B shows an experimental B-H curve of an exchange-coupled, hard and soft phase, nanocomposite resulting from a Fe$_3$O$_4$ (particle size=4 nm):Fe$_{58}$Pt$_{42}$(particle size=4 nm) binary self-assembly with an initial mass ratio of 1:10 in an exemplary embodiment of the present invention. The measured (BH)$_{max}$ for the single-phase Fe$_{58}$Pt$_{42}$ nanoparticle assembly is 14.7 MGOe. However, for the nanocomposite resulting from the Fe$_3$O$_4$(particle size=4 nm):Fe$_{58}$Pt$_{42}$(particle size=4 nm) binary self-assembly, (BH)$_{max}$ reaches 20.1 MGOe in an exemplary embodiment of the present invention, exceeding the value for the single phase Fe$_{58}$Pt$_{42}$ assembly by 37%, and the theoretical limit of 13 MGOe for a non-exchange-coupled isotropic FePt by over 50%. This (BH)$_{max}$ enhancement clearly indicates exchange-coupling between the hard and soft magnetic phases in an exemplary embodiment of the present invention.

In various exemplary embodiments, the hard-soft phase, exchange-coupled nanocomposites prepared by the processes above may be compacted to form a higher-density, hard-soft phase, exchange-coupled nanocomposite that is substantially devoid of spaces between the magnetic materials in order to obtain a bulk permanent magnet. Compaction may, for example, be performed by mechanical forces, or by other means of compaction well known in the art.

These experimental results indicate that with alignment of the magnetic easy axis and compaction of the annealed nanocomposite, the hard-soft phase, exchange-coupled, nanocomposites of various exemplary embodiments of the present invention may be made into bulk permanent magnets with an energy product approaching 50–100 MGOe. Such aligned exchange-coupled spring magnets may enable more efficient electric motors, which may be lighter, smaller, and rotate at higher speeds, permanent magnet biased bearings that allow lubeless motors and generators.

While the invention has been described in terms of exemplary embodiments, those skilled in the art will recognize that the invention can be practiced with modification within the spirit and scope of the appended claims.

Further, it is noted that Applicants' intent is to encompass equivalents of all claim elements, even if amended later during prosecution.

What is claimed is:

1. A process of forming a multi-component nanoparticle self-assembly, comprising:
   forming a first dispersion including nanoparticles of a first component;
   forming a second dispersion including nanoparticles of a second component;
   mixing the first and the second dispersions to form a mixed dispersion; and
   removing a solvent from the mixed dispersion,
   wherein removing the solvent results in a self-assembly of the nanoparticles of the first and the second components in a locally-ordered nanostructure, and
   wherein the nanoparticles of the first component and the nanoparticles of the second component are surrounded by a coating that prevents agglomeration of the nanoparticles in the first, the second, and the mixed dispersions.

2. The process of claim 1, wherein the first component comprises a soft magnetic material and the second component comprises a hard magnetic material.

3. The process of claim 2, wherein the soft magnetic material comprises at least one of Co, Fe, Ni, CoFe, NiFe, Co$_2$O$_3$, FeO, Fe$_2$O$_3$, Fe$_3$O$_4$, NiO, and ferrites including MFe$_2$O$_4$ where M comprises one of Co and Ni, and the hard magnetic material comprises at least one of CoPt, FePt, SmCo-based alloys, and NdFeB-based materials.

4. The process of claim 1, wherein the solvent comprises at least one of water, alcohols, ketones, aldehydes, ethers, esters, hydrocarbons, aromatics, and organic halides.

5. The process of claim 1, wherein said coating comprises an organic coating.

6. The process of claim 1, wherein said solvent comprises an organic solvent.

7. The process of claim 1, wherein said locally-ordered nanostructure comprises said nanoparticles of said first component and said nanoparticles of said second component which are self-assembled.

8. The process of claim 1, wherein said removing said solvent comprises evaporating said solvent from said mixed dispersion.

9. A process of forming a core-shell structured nanoparticle self-assembly, comprising:
forming a dispersion including core-shell structured nanoparticles; and
removing a solvent from the dispersion,
wherein removing the solvent results in a self-assembly of the core-shell structured nanoparticles in a locally-ordered nanostructure, and
wherein said nanoparticles comprise soft core, hard shell, core-shell structured nanoparticle having a soft core diameter comparable to a domain wall width of a hard phase in an exchange-coupled, magnetic nanocomposite, which is about 10 mn to about 20 nm.

10. The process of claim 9, wherein said core and said shell of each of the core-shell structured nanoparticles comprise complementary hard and soft magnetic materials.

11. The process of claim 10, wherein the soft magnetic material comprises at least one of Co, Fe, Ni, CoFe, NiFe, $Co_2O_3$, FeO, $Fe_2O_3$, $Fe_3O_4$, NiO, and ferrites including $MFe_2O_4$ where M comprises one of Co and Ni, and the hard magnetic material comprises at least one of CoPt, FePt, SmCo-based alloys, and NdFeB-based materials.

12. The process of claim 10, wherein said core-shell structured nanoparticles serve as building blocks in said locally-ordered nanostructure.

13. The process of claim 9, wherein the core-shell structured nanoparticles are each surrounded by a coating that prevents agglomeration of the core-shell structured nanoparticles in the dispersion.

14. The process of claim 9, wherein the solvent comprises at least one of water, alcohols, ketones, aldehydes, ethers, esters, hydrocarbons, aromatics, and organic halides.

15. A process of forming a core-shell structured nanoparticle self-assembly, comprising:
forming a dispersion including core-shell structured nanoparticles; and
removing a solvent from the dispersion,
wherein removing the solvent results in a self-assembly of the core-shell structured nanoparticles in a locally-ordered nanostructure, and
wherein said nanoparticle comprises hard core, soft shell, core-shell structured nanoparticles having a soft shell with a thickness comparable to a domain wall width of a hard phase in an exchange-coupled, magnetic nanocomposite which is about 10 nm to about 20 nm.

16. A process of forming an exchange-coupled magnetic nanocomposite, comprising:
forming a multi-component nanoparticle self-assembly, comprising:
forming a first dispersion including nanoparticles of a first component;
forming a second dispersion including nanoparticles of a second component;
mixing the first and the second dispersions to form a mixed dispersion; and
removing a solvent from the mixed dispersion, wherein removing the solvent results in a self-assembly of the nanoparticles of the first and the second components in a locally-ordered nanostructure; and
removing a coating from a plurality of magnetic nanoparticles that are disposed in a self-assembled, locally-ordered nanostructure to form a hard-soft, exchange-coupled nanocomposite.

17. The process of claim 16, wherein the hard-soft, exchange-coupled nanocomposite comprises a soft magnetic phase including one of Co, Fe, Ni, CoFe, and NiFe, $Co_2O_3$, FeO, $Fe_2O_3$, $Fe_3O_4$, and NiO, and ferrites including $MFe_2O_4$ where M comprises one of Co and Ni, and a hard magnetic phase including one of CoPt, FePt, SmCo-based alloys, and NdFeB-based materials.

18. The process of claim 16, wherein the coating comprises an organic or inorganic volatile matrix that is volatilized by an energetic process.

19. The process of claim 16, wherein said removing comprises an annealing process performed under reducing conditions including hydrogen gas and an inert gas, carbon monoxide, or alkali and alkaline earth metals.

20. The process of claim 19, wherein the reducing conditions are maintained in a reaction vessel under vacuum.

21. The process of claim 19, wherein a temperature of the annealing process is from about 100° C. to about 1000° C.

22. The process of claim 19, wherein a temperature of the annealing process is from about 500° C. to about 800° C.

23. The process of claim 16, wherein said removing comprises an annealing process performed under at least one of an energetic beam irradiation, a magnetic field, an electric field, a pressure, and a stress.

24. The process of claim 16, further comprising:
mechanically compacting the hard-soft, exchange-coupled nanocomposite to obtain a higher-density, hard-soft, exchange-coupled nanocomposite that is substantially devoid of spaces between magnetic materials.

25. The process of claim 16, wherein said nanocomposite comprises an exchange-spring magnet having an enhanced energy product.

26. A process of forming an exchange-coupled magnetic nanocomposite, comprising:
forming a core-shell structured nanoparticle self-assembly, comprising:
forming a dispersion including core-shell structured nanoparticles; and
removing a solvent from the dispersion, wherein said removing the solvent results in a self-assembly of the core-shell structured nanoparticles in a locally-ordered nanostructure; and
removing a coating from a plurality of magnetic nanoparticles that are disposed in a self-assembled, locally-ordered nanostructure to form a hard-soft, exchange-coupled nanocomposite.

27. A process of forming a multi-component nanoparticle self-assembly, comprising:
forming a first dispersion including nanoparticles of a first component;
forming a second dispersion including nanoparticles of a second component;
mixing the first and the second dispersions to form a mixed dispersion;
removing a solvent from the mixed dispersion, wherein said removing the solvent results in a self-assembly of the nanoparticles of the first and the second components in a locally-ordered nanostructure, and
coating said nanoparticles of said first component and said nanoparticles of said second component with a coating material to inhibit agglomeration,
wherein said removing said solvent from said mixed dispersion comprises adding a material to separate said nanoparticles of said first component and nanoparticles of said second component from said solvent via precipitation by interaction of said added material with said coating material.

28. A process of forming a multi-component nanoparticle self-assembly, comprising:
- forming a first dispersion including nanoparticles of a first component;
- forming a second dispersion including nanoparticles of a second component;
- mixing the first and the second dispersions to form a mixed dispersion; and
- removing a solvent from the mixed dispersion, wherein said removing the solvent results in a self-assembly of the nanoparticles of the first and the second components in a locally-ordered nanostructure,
- wherein said nanoparticles of said first component and said nanoparticles of said second component self-assemble to provide a local ordering such that one of said nanoparticles of said first component is surrounded by a plurality of said nanoparticles of said second component.

* * * * *